(12) United States Patent
Preston

(10) Patent No.: X6157
(45) Date of Patent: Oct. 1, 1830

(54) STRAW CUTTER

(76) Inventor: Titus Preston

Titus Preston
Letters Patent

The Schedule referred to in these Letters Patent and making part of the same containing a description in the words of the said Titus Preston himself of his improvement in the machine for Cutting Straw for feeding Cattle called "Preston's improved Straw Cutter."

To all to whom these presents shall come —

Be it known that I Titus Preston of Wallingford in the County of New Haven and State of Connecticut a native citizen of said State have invented a new and useful improvement in the machine for cutting Straw for feeding Cattle called "Preston's improved Straw cutter" and that the following is a full and exact description of construction and operation of said machine as invented or improved by me. including for a more clear illustration, parts of the Machine heretofore in use in connection with my improvements.

My improved straw cutter consists of an outer or main box. supported on four legs, and an inner box or feeder sliding within it moved by a rack and endless screw connected with the shaft of the knife wheel and thereby drawing the straw to the operation of the knife. In describing the parts. I call the end at the knife the front or fore end, the other the back or rear end. the side next the person using the machine I call the near side — the other the off side. The machine may be proportionally greater or less than the one herein described. but I prefer the following dimensions viz. For the outside or main box. the top and ends of which are open make the sides three feet eight inches long one foot two two and a half inches high. the bottoms seven inches wide of the same length, and all 7/8 of an inch thick. On the inside of the off side piece I make a groove one fourth of an inch wide, half an inch deep and half an inch from the bottom to receive a pin on the side of the feeder and thereby guide its motion. I also make a groove in the upper side of the bottom an inch wide and half an inch deep, the centre to be two inches from the off inside of the bottom and extending from the back end, to within five inches of the front and there ending with a slant upwards to permit the straw to rise. This groove is made to permit the racks on the bottom of the feeder to pass freely. On the forward end of the box next to the knife I fix a cramping piece of wood five inches wide, one and a quarter thick made fast to the inside of the off side piece and extending from the bottom to the top of the box. the upper part of the back edge must be fitted to the circular motion of the press board, hereafter described and must be beveled to permit the free passage of the straw near the same end of the box. I also suspend a press board. the width of the inside of the box and thirteen inches long, traversing on pivots inserted near the top edge of the box, eleven inches from the front end of the box and one inch from the back end of the board. The traversing end of the press board is fitted to the circular bevel of the cramp board, and on it is fixed a block an inch and a half thick and near the lower back edge of that is attached an iron dog or latch 2½ inches long, playing into a circular rack of cast iron sunk its thickness into the inside of the near side of the box and descending six inches from the top with cogs, one quarter of an inch from centres. The use of the cramping piece piece and pressboard is to compress the straw as it approach-
es the knife. On the same end of the box I fix firmly
with screws a strip of steel welded upon tough iron and
made very hard and ground true and even to receive
and guard the edge of the knife. This strip is about
three fourths of an inch wide and one fourth thick
rising about ten inches upon the inside edge of the
cramping piece and turning a square corner ex-
tends about four inches on the bottom and is setted
its full thickness into both. the ends being a little
slanted to receive the knife. A top piece one and a
half inch wide may be shouldered down and fasten-
-ed across the top of the fore end of the box to pre-
serve its regular width. The feeding box I make in
the following manner. the top and ends are open like the oth-
er, the sides are three feet 2½ inches long about eleven inches
high. three fourths of an inch thick. the bottom is of the same
length an inch or more thick and of a width to slide easily
in the main box. within and across the feeding box I erect
a gate to slide up and down, with teeth on the bottom to
press on the straw and hold it fast. The posts of the gate
should be of tough timber one inch thick and three wide
standing up and down inside of the box inserted with a dove
tail groove into the sides half an inch deep. when
they may be glued and fastened and the projecting edges
near the bottom trimm'd off. The posts must be placed
at such distance from the fore-end as just to clear the
press-board when the other end comes over with the hind
end of the main box. The near post may be sixteen in-
ches long, the other two feet. Each post has a groove facing
the other, half an inch deep and three fourths wide. A gate of
suitable dimensions slides up and down in these grooves, the
top of which is shaped for a handle, the bottom is sawed into
teeth teeth to hold in the straw. I then fit into the off gate post adjoining
the groove and making part of the back side of it a rack seven
and a half inches long), the lower end to be 9½ inches from
the bottom, it may be half an inch square and let in the depth of
the groove and there fastened with screws the cogs or teeth a
quarter of an inch apart, the under side square. A dog fom
inches long is fix'd on a pivot near the bottom of the gate to play
into the rack and thus hold fast the pressure of the gate upon the
straw. a hook from one gate post to the other. secures the box
from spreading. A suitable handle is also attached to the near
corner of the rear end of this box to raise that end, and draw
back the box as occasion may require and the upper corners
of the forward end of the feeding box are slanted off to pre-
vent their interference with the press board. To prevent the feed-
ing box from rising. I drive an iron cog or pin a quarter
of an inch in diameter into its off side half an inch back
from the free end and half an inch from the bottom leaving
half an inch of its length projecting to enter and slide in
the groove made to receive it in the side of the main box.
This pin or cog passes through an iron plate three inches
long. sunk in and fastened to the side. The under corner
of the plate and of the box are rounded off, to permit the rear
end of the box to be raised without straining on the cog. A
moveable check pin may be inserted across the groove to prevent
the feeding box being drawn back so far as to ungear the
machinery. The feeding box when drawn back rests on a sup
port extending, from the rear of the main box about one foot
placed a little obliquely to avoid the screw wheels but
level with the upper side of the bottom. The feeding box is
moved forward by a screw wheel made fast on the rear end
of the main shaft playing, into a rack on the under
side of the feeding box. This rack I make of cast iron.
two feet six inches long, with suitable trunnions to fast
en en it by and may be cast in two pieces 15/16th of an inch thick
of which I take 7/16 for the cogs which are set a little bevill-
ing to fit the bevel of the screw. The back side of the cogs
are perpendicular to the base. the other side bevels at the
rate of six inches in twelve, leaving the out end less
than one eighth of an inch and the space between the
cogs a little more. The distance between the cogs from
the centre to centre seven sixteenths of an inch. This
rack is let into the under side of the bottom of the feeding
box about one fourth of an inch. directly over the centre of
the shaft. and over the groove in the bottom of the main
box. the teeth or cogs projecting so as to fit into the screw
wheel the top of which is to be level with the top side of
the bottom of the main box a part of which is cut away
to receive it. The wheel which I call a screw wheel to
work in this rack I also make of cast iron. The front
part for the screw is four and a quarter inches in diam-
eter and tapers back with a curve to one and and three
fourth inch in diameter leaving it two and a quarter
inches thick in the centre. thro' which is a hole for the
shaft tapering, from 1 1/2 in front to 1 1/8 inch in diam-
eter. I leave a notch one fourth of an inch broad and
three eighths deep in the opposite sides of the back. for a
key, to pass through it and the shaft, to prevent its
turning on the shaft. Three and a quarter inches in
diameter of the front side of this wheel. presents a flat smooth
surface to the cail. the other half inch all round forms the
screw gaining about seven sixteenths of an inch, or one
cog of the rack on each revolution or the thread of this
screw may stand at right angles with the shaft half-
way round. while the knife is cutting, then so oblique as
to gain a cog, in completing the revolution when so
made the straw will be stationary while cutting and move only while the knife is coming round The main box is supported by two legs at each end of firm wood three feet ten inches long, and two and a quarter inches square. Each pair of legs is connected by a rail (made of hard two inch plank 8 or 9 inches wide. The front rail is 19½ inches long. the other 15½ inches. The top of the rails when finished, to be two and a half feet from the floor. The rails are fitted to the front side of the legs by shoulders of at least half their thickness all except the off fore leg. slanting or bevelling out 1½ inch in 12 as they go down. the other to slant 4 in 12. to brace against the force of cutting, leaving the shoulders on the upper edge of the front rail 11 inches apart. The posts above the rails are then trimmed and fitted to the size of the box. Holes are bored through these rails. in the front rail 2 inches, in the other 1½ inch in diameter, the centre of each 1¼ inch from the top of the rail and two inches from the off inside of the box. The shaft I make of hard wood about four and a half feet long and two inches in diameter. The front end is left square about 3 inches, to receive the knife plank. the remainder of the length is made round in a lathe and fitted to pass thro' the holes in the rails with a shoulder in front of the back rail and also through the screw wheel behind it. The shaft when in place projects in front of the box about four and a half inches and behind the screw wheel two inches. The plank to carry the knife is of firm wood two inches thick; about two feet two inches long and sixteen inches wide, shaped at one end to the curve of the knife. the other is made circular, projecting as a balance This plank has a mortise two inches square near the centre to receive the end of the shaft and is there made fast in the usual manner of securing in place a joiners thereof and for these jointly and severally I claim an exclusive right and pray that the same may be secured to me by Letters Patent. In testimony whereof I set my hand and seal this twenty ninth day of June A.D. 1830.

Witnesses
Ebenezer Baldwin
Simeon Baldwin

Tilly Preston

Cyd
Hyl